United States Patent
Murakami et al.

(10) Patent No.: US 10,711,890 B2
(45) Date of Patent: Jul. 14, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventors: Yuki Murakami, Okazaki (JP); Masakazu Owatari, Nagakute (JP); Norihiro Tsukamoto, Toyota (JP); Kengo Nagai, Toyota (JP); Satoshi Kato, Toyota (JP); Susumu Moritomo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 16/154,878

(22) Filed: Oct. 9, 2018

(65) Prior Publication Data
US 2019/0145516 A1 May 16, 2019

(30) Foreign Application Priority Data
Nov. 13, 2017 (JP) ................................. 2017-218594

(51) Int. Cl.
*F16H 61/70* (2006.01)
*F16H 61/662* (2006.01)
(Continued)

(52) U.S. Cl.
CPC ......... *F16H 61/702* (2013.01); *F16H 61/662* (2013.01); *F16H 37/022* (2013.01);
(Continued)

(58) Field of Classification Search
CPC ...... F16H 61/702; F16H 61/662; F16H 61/16; F16H 2061/0477; F16H 2061/163;
(Continued)

(56) References Cited

U.S. PATENT DOCUMENTS

| | | | | |
|---|---|---|---|---|
| 2010/0248875 A1* | 9/2010 | Jozaki | ............... | F16H 61/66259 474/29 |
| 2011/0015838 A1* | 1/2011 | Takahashi | ............. | F16H 61/702 701/55 |

(Continued)

FOREIGN PATENT DOCUMENTS

| | | |
|---|---|---|
| JP | 2015-148281 A | 8/2015 |
| JP | 2016-014406 A | 1/2016 |

*Primary Examiner* — Jacob S. Scott
*Assistant Examiner* — Lori Wu
(74) *Attorney, Agent, or Firm* — Oliff PLC

(57) ABSTRACT

A control apparatus for a vehicle drive-force transmitting apparatus which includes a gear mechanism and a continuously-variable transmission mechanism and which establishes selectively a first state in which a drive force is transmitted by the gear mechanism and a second state in which the drive force is transmitted by the continuously-variable transmission mechanism. The control apparatus sets a shift-up-action permitted gear ratio of the continuously-variable transmission mechanism, which makes a state-switch-requiring shift-up action is permitted to be executed. When a running speed of the vehicle is not higher than a given value, a predetermined high gear ratio value is set as the shift-up-action permitted gear ratio. When the running speed is higher than the given value, a predetermined gear ratio range ranging from the predetermined high gear ratio value to a predetermined low gear ratio value is set as the shift-up-action permitted gear ratio.

9 Claims, 4 Drawing Sheets

(51) Int. Cl.
*F16H 59/44* (2006.01)
*F16H 37/08* (2006.01)
*F16H 37/02* (2006.01)
*F16H 61/04* (2006.01)

(52) U.S. Cl.
CPC .......... *F16H 37/0846* (2013.01); *F16H 59/44* (2013.01); *F16H 2037/0873* (2013.01); *F16H 2061/0477* (2013.01)

(58) Field of Classification Search
CPC ............... F16H 37/022; F16H 37/0846; F16H 2037/0873; F16H 59/44
See application file for complete search history.

(56) References Cited

U.S. PATENT DOCUMENTS

2012/0065854 A1\* 3/2012 Stoller .................... F16H 61/10
 701/60
2016/0347317 A1 12/2016 Fukao et al.

\* cited by examiner

CONTROL APPARATUS FOR VEHICLE DRIVE-FORCE TRANSMITTING APPARATUS

This application claims priority from Japanese Patent Application No. 2017-218594 filed on Nov. 13, 2017, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a drive-force transmitting apparatus that is to be provided in a vehicle having a drive force source and drive wheels, wherein the drive-force transmitting apparatus includes: an input rotary member to which a drive force is to be transmitted from the drive force source; an output rotary member from which the drive three is to be outputted to the drive wheels; a continuously-variable transmission mechanism; and a gear mechanism configured to provide at least one gear ratio, and wherein the drive-force transmitting apparatus defines a plurality of drive-force transmitting paths that are provided in parallel with each other between the input rotary member and the output rotary member. The plurality of drive-force transmitting paths include a first drive-force transmitting path through which the drive force is to be transmitted by the gear mechanism and a second drive-force transmitting path through which the drive force is to be transmitted by the continuously-variable transmission mechanism, such that a selected one of the first and second drive-force transmitting paths is established. JP-2015-148281A discloses such a control apparatus for a drive-force transmitting apparatus that is to be provided in a vehicle. This publication of Japanese Patent Application discloses that, in the drive-force transmitting apparatus in which a gear mechanism and a continuously-variable transmission mechanism are provided to be parallel with each other, the continuously-variable transmission mechanism is a belt-type continuously-variable transmission including a primary pulley, a secondary pulley and a transmission belt that is looped over the two pulleys, and the continuously-variable transmission mechanism provides a continuously-variable gear ratio which is variable within a given range and which is lower than a gear ratio provided by the gear mechanism. The publication also discloses that a shift-up action requiring the selected drive-force transmitting path to be switched from the first drive-force transmitting path (through which the drive force is to be transmitted by the gear mechanism) to the second drive-force transmitting path (through which the drive force is to be transmitted by the continuously-variable transmission mechanism) is executed when the continuously-variable transmission mechanism establishes a highest gear ratio value that corresponds to a maximum value within the given range of the continuously-variable gear ratio. It is noted that the term "gear ratio" is defined as "rotational speed of input-side rotary member/rotational speed of output-side rotary member". For example, the gear ratio of the above-described drive-force transmitting apparatus is defined as "rotational speed of the input rotary member/rotational speed of the output rotary member", and the gear ratio of the above-described belt-type continuously-variable transmission is defined as "rotational speed of the primary pulley/rotational speed of the secondary pulley". It is also noted that the above-described expression that the continuously-variable gear ratio of the continuously-variable transmission mechanism is lower than the gear ratio provided by the gear mechanism, is interpreted to mean that the continuously-variable gear ratio of the continuously-variable transmission mechanism makes a vehicle running speed higher than the gear ratio of the gear mechanism, and that the highest gear ratio value of the continuously-variable transmission mechanism can be expressed also as a lowest-speed gear ratio.

SUMMARY OF THE INVENTION

By the way, the switching between a first state in which the first drive-force transmitting path is established and a second state in which the second drive-force transmitting path is established, requires a stepped shifting action. In view of controllability of the stepped shifting action, the shifting action for the switching could be executed between predetermined two gear ratios. For example, when the first state is to be switched to the second state, it might be possible to set the highest gear ratio value of the continuously-variable transmission mechanism as a shift-up-action permitted gear ratio that makes the stepped shift-up action (required for the switching from the first state to the second state) permitted to be executed. However, there could be a case where the gear ratio of the continuously-variable transmission mechanism cannot be controlled to the highest gear ratio value, for example, due to a malfunction or limitation in control. In such a case in which the gear ratio of the continuously-variable transmission mechanism cannot be controlled to the highest gear ratio value, the above-described stepped shift-up action is not permitted to be executed. If execution of the stepped shift-up action is not permitted during running in the first state in which the first drive-force transmitting path is established, the vehicle would run even in a high running-speed range at the gear ratio of the gear mechanism that is higher than the gear ratio of the continuously-variable transmission mechanism, so that the rotational speed of the drive force source could become high enough to reach an excessively high speed ratio range (i.e., over-revolution range). If an accelerator is released with the rotational speed of the drive force source being excessively high, an abrupt deceleration could be caused whereby the drivability could be reduced. Further, where the drive force source is an engine, a fuel-cut control could be frequently executed at an increased number of times whereby the drivability could be reduced.

The present invention was made in view of the background art described above. It is therefore an object of the present invention to provide a control apparatus for a vehicle drive-force transmitting apparatus, which is capable of restraining reduction of the drivability, owing to an appropriate setting of a shift-up-action permitted gear ratio of a continuously-variable transmission mechanism that makes a stepped shift-up action of the drive-force transmitting apparatus (required for switching from a first state in which a first drive-force transmitting path is established to a second state in which a second drive-force transmitting path is established) permitted to be executed.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: an input rotary member to which a drive force is to be transmitted from the drive force source; an output rotary member from which the drive force is to be outputted to the drive wheels; a continuously-variable transmission mechanism configured to provide a continuously-variable gear ratio that is variable within a given range; and a gear mechanism configured to provide at least a gear ratio that is higher than the continuously-variable gear ratio provided by the continuously-variable transmission mechanism. The drive-force transmitting apparatus defines a plurality of drive-force transmitting paths that are provided in parallel with each other between the input rotary member and the output rotary member such that the drive force is to be transmitted from the input rotary member to the output rotary member through an established one of the drive-force transmitting paths. The plurality of drive-force transmitting paths include a first drive-force transmitting path, through which the drive force is to be transmitted by the gear mechanism when the first drive-force transmitting path is established. The plurality of drive-force transmitting paths include a second drive-force transmitting path, through which the drive force is to be transmitted by the continuously-variable transmission mechanism when the second drive-force transmitting path is established. The drive-force transmitting apparatus is configured to establish a selected state that is one of (i) a first state in which the first drive-force transmitting path is established and (ii) a second state in which the second drive-force transmitting path is established, such that the selected state is switched from the first state to the second state when a state-switch-requiring shift-up action is executed in the drive-force transmitting apparatus. The control apparatus comprises a shift-up-action permitted gear-ratio setting portion configured to set a shift-up-action permitted gear ratio that is a value or a range of the continuously-variable gear ratio of the continuously-variable transmission mechanism, which makes the state-switch-requiring shift-up action permitted to be executed, such that the state-switch-requiring shift-up action requiring the selected state to be switched from the first state to the second state is permitted to be executed when the continuously-variable gear ratio of the continuously-variable transmission mechanism corresponds to the shift-up-action permitted gear ratio. The shift-up-action permitted gear-ratio setting portion is configured, when a running speed of the vehicle is not higher than a given value, to set a predetermined high gear ratio value as the shift-up-action permitted gear ratio. The shift-up-action permitted gear-ratio setting portion is configured, when the running speed of the vehicle is higher than the given value, to set, as the shift-up-action permitted gear ratio, a predetermined gear ratio range ranging from the predetermined high gear ratio value to a predetermined low gear ratio value that is lower than the predetermined high gear ratio value. It is noted that the continuously-variable transmission mechanism, which is configured to provide the continuously-variable gear ratio, may be interpreted also to be configured to provide a plurality of gear ratios that are to be switched from one to another by a stepless shifting action. It is also noted that the control apparatus may further comprises a state determining portion configured to determine whether the running speed of the vehicle is not higher than the given value or not, wherein the shift-up-action permitted gear-ratio setting portion is configured, when the state determining portion determines that the running speed is not higher than the given value, to set the predetermined high gear ratio value as the shift-up-action permitted gear ratio, and wherein the shift-up-action permitted gear-ratio setting portion is configured, when the state determining portion determines that the running speed is higher than the given value, to set the predetermined gear ratio range as the shift-up-action permitted gear ratio.

According to a second aspect of the invention, in the control apparatus according to the first aspect of the invention, the predetermined high gear ratio value is a highest value within the given range in which the continuously-variable gear ratio of the continuously-variable transmission mechanism is variable, or is a value adjacent to the highest value.

According to a third aspect of the invention, in the control apparatus according to the first or second aspect of the invention, the given value of the running speed of the vehicle is a predetermined limit speed value that causes a rotational speed of the drive force source to be an allowable upper limit speed value during running of the vehicle in the first state in which the first drive-force transmitting path is established.

According to a fourth aspect of the invention, in the control apparatus according to the first or second aspect of the invention, the given value of the running speed of the vehicle is a predetermined speed value at which the state-switch-requiring shift-up action is determined to be executed.

According to a fifth aspect of the invention, in the control apparatus according to any one of the first through fourth aspects of the invention, the drive-force transmitting apparatus further includes a first engagement device that is provided in the first drive-three transmitting path and a second engagement device that is provided in the second drive-force transmitting path, wherein the first drive-force transmitting path is to be established by engagement of the first engagement device while the second drive-force transmitting path is to be established by engagement of the second engagement device, and wherein the state-switch-requiring shift-up action is executed by release of the first engagement device and engagement of the second engagement device.

According to a sixth aspect of the invention, in the control apparatus according to the fifth aspect of the invention, the second engagement device is a frictional engagement device, wherein the predetermined low gear ratio value is a predetermined limit gear ratio value that causes the second engagement device to be heated by an allowable upper limit degree in process of the engagement of the second engagement device.

According to a seventh aspect of the invention, in the control apparatus according to the sixth aspect of the invention, the predetermined low gear ratio value is increased with increase of the running speed of the vehicle.

According to an eighth aspect of the invention, in the control apparatus according to any one of the first through seventh aspects of the invention, the continuously-variable transmission mechanism is a belt-type continuously-variable transmission including a primary pulley, a secondary pulley, a transfer element that is looped over the primary and secondary pulleys.

In the control apparatus according to the first aspect of the invention, the predetermined high gear ratio value or the predetermined gear ratio range is set as the shift-up-action permitted gear ratio that is a value or a range of the continuously-variable gear ratio of the continuously-variable transmission mechanism, which makes the state-switch-requiring shift-up action permitted to be executed. Owing to the setting of the shift-up-action permitted gear ratio to the predetermined high gear ratio value or the predetermined gear ratio range, the controllability of the state-switch-requiring shift-up action is improved. Further, the predetermined high gear ratio value is a value which lies in the above-described given range (within which the continuously-variable gear ratio of the continuously-variable transmission mechanism is variable) and which is relatively close or adjacent to the gear ratio provided in the first drive-force transmitting path, so that it is possible to restrain an amount of change of the rotational speed of the input rotary member which is caused by execution of the state-switch-requiring shift-up action. Moreover, when the running speed of the vehicle is higher than the given value, the predetermined gear ratio range is set as the shift-up-action permitted gear ratio, wherein the predetermined gear ratio range ranges from the predetermined high gear ratio value to a predetermined low gear ratio value that is lower than the predetermined high gear ratio value, so that, even if the gear ratio of the continuously-variable transmission mechanism cannot be controlled to the predetermined high gear ratio value due to a failure or other factor, there is a case where the state-switch-requiring shift-up action can be executed when the running speed of the vehicle is higher than the given value. Thus, it is possible to avoid the rotational speed of the drive force source from being excessively increased due to running of the vehicle in a high running-speed range with the first drive-force transmitting path being established. Thus, the shift-up-action permitted gear ratio (which makes the state-switch-requiring shift-up action permitted to be executed) is set appropriately for restraining reduction of the drivability.

In the control apparatus according to the second aspect of the invention, the predetermined high gear ratio value is a highest value within the given range in which the gear ratio of the continuously-variable transmission mechanism is variable, or is a value adjacent to the highest value. In other words, the predetermined high gear ratio value is the substantially highest value with the above-described given range. Thus, the controllability of the state-switch-requiring shift-up action is improved. Further, it is possible to restrain the amount of change of the rotational speed of the input rotary member which is caused by execution of the state-switch-requiring shift-up action.

In the control apparatus according to the third aspect of the invention, the given value of the running speed of the vehicle is a predetermined limit speed value that causes the rotational speed of the drive force source to be an allowable upper limit speed value during running of the vehicle in the first state in which the first drive-force transmitting path is established, so that the rotational speed of the drive force source is avoided or restrained from exceeding, the allowable upper limit speed value. Further, it is possible to maximize a running speed range of the vehicle in which the state-switch-requiring shift-up action is not permitted to be executed without the gear ratio of the continuously-variable transmission mechanism being the predetermined high gear ratio value.

In the control apparatus according to the fourth aspect of the invention, the given value of the running speed of the vehicle is a predetermined speed value at which the state-switch-requiring shift-up action is determined to be executed. Thus, the rotational speed of the drive force source is reliably avoided or restrained from exceeding the allowable upper limit speed value.

In the control apparatus according to the fifth aspect of the invention, the state-switch-requiring shift-up action is executed by release of the first engagement device provided in the first drive-force transmitting path and engagement of the second engagement device provided in the second drive-force transmitting path. Thus, the controllability of the state-switch-requiring shift-up action is improved by the above-described setting of the shift-up-action permitted gear ratio of the continuously-variable transmission mechanism.

In the control apparatus according to the sixth aspect of the invention, the predetermined low gear ratio value is a predetermined limit gear ratio value, which causes the second engagement device to be heated by an allowable upper limit degree in process of the engagement of the second engagement device (that is a frictional engagement device), namely, which avoids the second engagement device from being heated by a degree exceeding the allowable upper limit degree in process of the engagement of the second engagement device. Thus, it is possible to restrain reduction of durability of the second engagement device which could be caused by execution of the state-switch-requiring shift-up action without the gear ratio of the continuously-variable transmission mechanism being the predetermined high gear ratio value.

In the control apparatus according to the seventh aspect of the invention, the predetermined low gear ratio value is increased with increase of the running speed of the vehicle. It is therefore possible to restrain increase of the amount of change of the rotational speed of the input rotary member upon execution of the shift-up action, which could be larger as the running speed is higher where the gear ratio of the continuously-variable transmission mechanism is not changed, and which causes heat generation in the second engagement device. Thus, it is possible to restrain reduction of durability of the second engagement device which could be caused by execution of the state-switch-requiring shift-up action without the gear ratio of the continuously-variable transmission mechanism being the predetermined high gear ratio value.

In the control apparatus according to the eighth aspect of the invention, the continuously-variable transmission mechanism is a belt-type continuously-variable transmission. Thus, even in event of a failure (i.e., belt-return failure) in which the gear ratio of the belt-type continuously-variable transmission cannot be controlled to the predetermined high gear ratio value, for example, due to a malfunction, there is a case where the state-switch-requiring shift-up action can be executed when the running speed of the vehicle is higher than the given value. Thus, the reduction of drivability can be restrained owing to the above-described setting of the shift-up-action permitted gear ratio of the belt-type continuously-variable transmission.

DETAILED DESCRIPTION OF PREFERRED EMBODIMENT

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing a belt slippage in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

Embodiment

Figure 1:
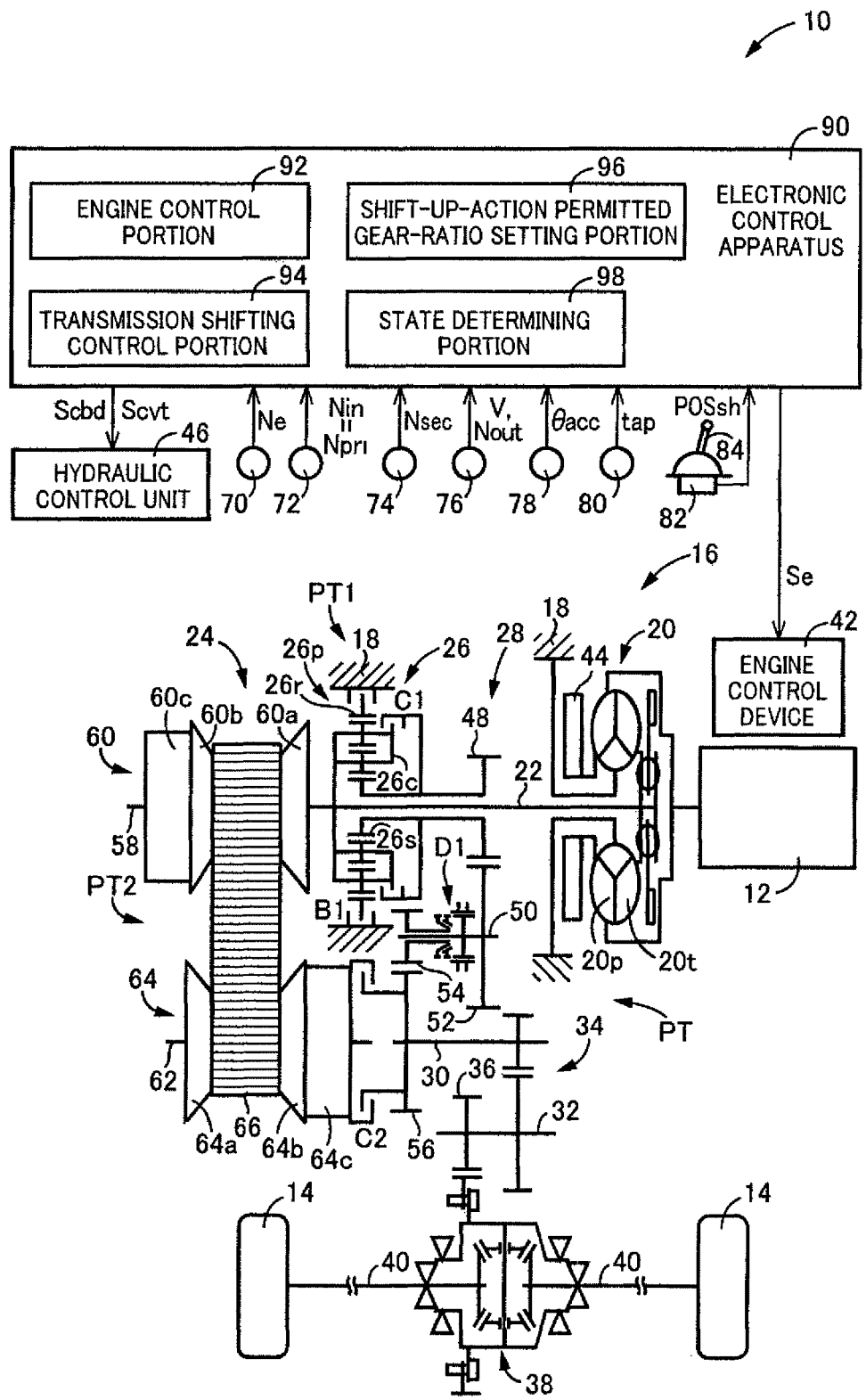
FIG. 1 is a schematic view showing a construction of a vehicle to be controlled by a control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is disposed in the first drive-force transmitting path PT1 and is configured to selectively connect and disconnect the first drive-force, transmitting path PT1, such that the first drive-force transmitting path PT1 is established with engagement of the first clutch C1 during forward running of the vehicle 10. The first brake B1, which also serves as the first engagement device, is also disposed in the first drive-force transmitting path PT1 and is configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-three transmitting path PT2 and is configured to selectively connect and disconnect the second drive-three transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the above-described first engagement device to establish the first drive-force transmitting path PT1. That is, the first drive-force transmitting path PT1 is established with the dog clutch D1 and one of the first clutch C1 and first brake B1 being both engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

The continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shalt 62, a movable sheave 64b unrotatable about an axis of the secondary shaft 62 and axially movable relative to the fixed sheave 64a, and a hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the hydraulic actuator 64c, to clamp the transmission belt 66 that is mounted on the secondary pulley 64. The secondary pressure Psec is a hydraulic pressure supplied from the hydraulic control unit 46 to the hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding dimeter (effective diameter) of each of the pulleys 60, 64 is changeable and accordingly a gear ratio $\gamma cvt$ (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio $\gamma cvt$ of the continuously-variable transmission mechanism 24 is controlled to a target gear ratio $\gamma cvtt$ while the transmission belt 66 is prevented from being slipped.

In the continuously variable transmission mechanism 24, when the primary pressure Ppri is increased, the width of the V-shaped groove of the primary pulley 60 is reduced whereby the gear ratio $\gamma cvt$ is reduced. The reduction of the gear ratio $\gamma cvt$ corresponds to a shift-up action performed in the continuously-variable transmission mechanism 24. In the continuously-variable transmission mechanism 24, the lowest gear ratio $\gamma min$ is provided with the width of the V-shaped groove of the primary pulley 60 being minimized. Within a range of the gear ratio $\gamma cvt$ that can be provided by the continuously-variable transmission mechanism 24, the lowest gear ratio $\gamma min$ is a value of the gear ratio $\gamma cvt$ which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio $\gamma cvt$ is increased. The increase of the gear ratio $\gamma cvt$ corresponds to a shill-down action performed in the continuously-variable transmission mechanism 24. In the continuously-variable transmission mechanism 24, the highest gear ratio value (that may be referred also to as "lowest-speed gear ratio value") $\gamma max$ is provided with the width of the V-shaped groove of the primary pulley 60 being maximized. Within the range of the gear ratio $\gamma cvt$ that can be provided by the continuously-variable transmission mechanism 24, the highest gear ratio value $\gamma max$ is a value of the gear ratio $\gamma cvt$ which makes it possible to minimize the running speed of the vehicle 10. In the continuously-variable transmission mechanism 24, the belt slippage is prevented by the primary thrust Wpri and the secondary thrust Wsec, and the target gear ratio $\gamma cvtt$ is established by a combination of the primary thrust Wpri and the secondary thrust Wsec, rather than by only one of the primary thrust. Wpri and the secondary thrust Wsec. The gear ratio $\gamma cvt$ of the continuously-variable transmission mechanism 24 is dependent on a thrust ratio $\tau$ (=Wsec/Wpri) of the pulleys 60, 64. Namely, the gear ratio $\gamma cvt$ is changeable by change of the thrust ratio $\tau$. For example, the gear ratio $\gamma cvt$ is increased with increase of the thrust ratio $\tau$.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio value γmax of the continuously-variable transmission mechanism 24 which is the highest gear ratio value provided in the second drive-force transmitting path PT2. That is, the gear ratio EL is a value that makes it possible to reduce the running speed of the vehicle 10 more than the highest gear ratio value γmax. The gear ratio EL of the gear mechanism 28 corresponds to a first-speed gear ratio γ1 in the drive-force transmitting apparatus 16. The highest gear ratio value γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-three transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the primary rotational speed Npri is equivalent to a rotational speed of the primary pulley 60 and that the secondary rotational speed Nsec is equivalent to a rotational speed of the secondary pulley 64.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94, a shift-up-action permitted gear-ratio setting means or portion in the form of a shift-up-action permitted gear-ratio setting portion 96, and a state determining means or portion in the form of a state determining portion 98.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines Whether shifting from one of first and second speed positions to the other is to be executed or not, by applying the running speed V and the accelerator operation amount θacc to a predetermined relationship in the form of a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio value γmax that is the highest one of the gear ratios provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. Thus, as a result of the shifting up from the first speed position to the second speed position, the second drive-force transmitting path PT2 is established in place of the first drive-force transmitting path PT1 in the drive-force transmitting apparatus 16. When determining that the running mode is to be switched from the belt running mode to the gear running mode so as to execute the shifting down from the second speed position to the first speed position, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. Thus, as a result of the shifting down from the second speed position to the first speed position, the first drive-force transmitting path PT1 is established in place of the second drive-three transmitting path PT2 in the drive-force transmitting apparatus 16. In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Ppri and the secondary pressure Psec such that the target gear ratio γcvtt is provided in the continuously-variable transmission mechanism 24 while the belt slippage is not caused in the continuously-variable transmission mechanism 24.

Specifically, the transmission shifting control portion 94 calculates a target primary rotational speed Nprit, by applying the accelerator operation amount θacc and the running speed V to a predetermined relationship such as a CVT shifting map. The transmission shifting control portion 94 calculates a target gear ratio γcvtt (=Nprit/Nsec, based on the target primary rotational speed Nprit. The transmission shifting control portion 94 calculates an estimated value of the engine torque Te, by applying the throttle opening degree tap and the engine rotational speed Ne to a predetermined relationship such as an engine torque map. The transmission shifting control portion 94 calculates a turbine torque Tt, based on the estimated value of the engine torque Te and a predetermined relationship such as characteristic of the torque converter 20. The transmission shifting control portion 94 uses the turbine torque Tt as a primary input torque Tpri that is an input torque inputted to the primary pulley 60. The primary input torque Tpri is a torque that is to act on the primary shaft 58. The transmission shifting control portion 94 calculates a thrust ratio T for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 94 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 94 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 94 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

Each of the target primary thrust Wprit and the target secondary thrust Wsect is calculated by taking account of a required thrust that is minimally required for preventing the belt slippage in the continuously-variable transmission mechanism 24. The required thrust is a limit thrust that corresponds to a thrust shortly before occurrence of the belt slippage in the continuously-variable transmission mechanism 24.

The transmission shifting control portion 94 sets a primary limit thrust Wprilim that is the limit thrust for the primary pulley 60 and a secondary limit thrust Wseclim that is the limit thrust for the secondary pulley 64, by using equations (1) and (2) given below. In the equations (1) and (2), "α" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt*Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24. It is noted that the sheave angle α is an angle defined between a conical surface of each of the pulleys 60, 64 and a plane perpendicular to an axis of the each of the pulleys 60, 64.

$$W\text{prilim}=(T\text{pr}*\cos\alpha)/(2*\mu*R\text{pri}) \quad (1)$$

$$W\text{seclim}=(\gamma cvt*T\text{pri}*\cos\alpha)/(2*\mu*R\text{sec}) \quad (2)$$

The transmission shifting control portion 94 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvtt. The transmission shifting control portion 94 sets, as a target secondary thrust Wsect, a larger one of the secondary limit thrust Wseclim and the secondary shifting-control thrust Wsecsh. The transmission shifting control portion 94 calculates the target primary thrust Wprit (=Wsect/τ), based on the target secondary thrust Wsect and the thrust ratio τ that is required to establish the target gear ratio γcvtt.

As described above, the shift-up action (hereinafter referred to as "state-switch-requiring shift-up action") of the drive-force transmitting apparatus 16, which requires the running mode (i.e., selected state) to be switched from the gear running mode (i.e., first state) in which the first drive-force transmitting path PT1 is established to the belt running mode (i.e., second state) in which the second drive-force transmitting path PT2 is established, is executed by a stepped shifting-action control by which the first clutch C1 and the second clutch C2 are released and engaged, respectively. The state-switch-requiring shift-up action may be referred also as to "stepped shifting action" since it is executed by the stepped shifting-action control. In view of the controllability, it is preferable that the state-switch-requiring shift-up action is executed from the gear ratio EL of the gear mechanism 28 to a predetermined value of the continuously-variable gear ratio γcvt of continuously-variable transmission mechanism 24, as in a stepped shifting action by which a gear position is shifted to another gear position.

For restraining an amount of change of the primary rotational speed Npri and maintain a consistency of the drive force during the state-switch-requiring shift-up action, it is appropriate that a value of the gear ratio γcvt of the continuously-variable transmission mechanism 24 upon execution of the state-switch-requiring shift-up action is a predetermined high gear ratio value (that may be referred also to as "predetermined low speed-side gear ratio value") γlowf, which is in a given range (in which the gear ratio γcvt is variable) and which is relatively close or adjacent to the gear ratio EL of the gear mechanism 28. With the amount of change of the primary rotational speed Npri being restrained, an amount of heat generation upon engagement of the second clutch C2 can be restrained, for example. As described above, whether the state-switch-requiring shift-up action is to be executed or not is determined by using a shift-up line based on which it is determined whether the gear ratio EL provided by the gear mechanism 28 is to be switched to the highest gear ratio value γmax of the continuously-variable transmission mechanism 24. In the present embodiment, the predetermined high gear ratio value γlowf is a predetermined highest gear ratio value γmax.

The shift-up-action permitted gear-ratio setting portion 96 sets the highest gear ratio value γmax (as an example of the predetermined high gear ratio value γlowf) as a value of the gear ratio γcvt of the continuously-variable transmission mechanism 24, by which the state-switch-requiring shift-up action is permitted to be executed. This value of the gear ratio γcvt (by which the execution of the state-switch-requiring shift-up action is permitted) will be referred to as "shift-up-action permitted gear ratio γupp". Permitting the execution of the state-switch-requiring shift-up action corresponds to permitting an output of the hydraulic-control command signal Scbd for executing the state-switch-requiring shift-up action, which is determined, by using the stepped shifting map, to be executed.

Figure 5:
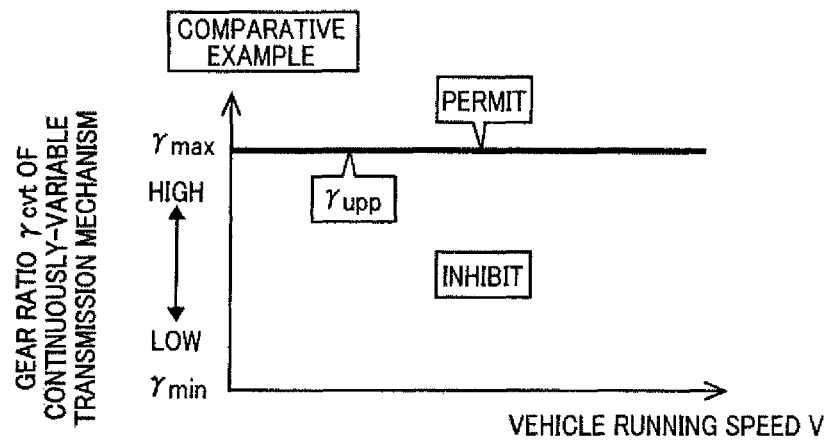
FIG. 5 is a view showing a relationship between the vehicle running speed and the shift-up-action permitted gear ratio in a comparative example in which a highest gear ratio value is set as the shift-up-action permitted gear ratio.
Figure 6:
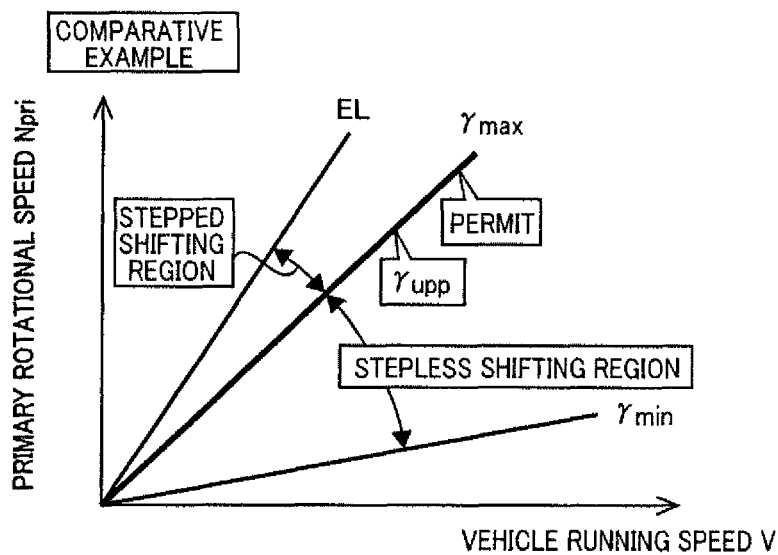
FIG. 6 is a view indicating the shift-up-action permitted gear ratio shown in FIG. 5, in a schematic view showing a stepped shifting map and a CVT shifting map, in the comparative example in which the highest gear ratio value is set as the shift-up-action permitted gear ratio.

FIG. 5 is a view showing a relationship between the vehicle running speed V and the shift-up-action permitted gear ratio γupp. FIG. 6 is a view indicating the shift-up-action permitted gear ratio γupp shown in FIG. 5, in a schematic view showing a stepped shifting map and a CVT shifting map. FIGS. 5 and 6 both show a comparative example in which only the highest gear ratio value γmax is set as the shift-up-action permitted gear ratio γupp. As shown in FIGS. 5 and 6, in this comparative example, when the gear ratio γcvt of the continuously-variable transmission mechanism 24 is the highest gear ratio value γmax, the state-switch-requiring shift-up action is permitted to be executed. When the gear ratio γcvt of the continuously-variable transmission mechanism 24 is not the highest gear ratio value γmax, the state-switch-requiring shift-up action is inhibited from being executed.

During the gear running mode, the transmission shifting control portion 94 controls the gear ratio γcvt of the continuously-variable transmission mechanism 24 to the highest gear ratio value γmax, in preparation for the state-switch-requiring shift-up action. Or alternatively, when determining that the state-switch-requiring shift-up action is to be executed during the gear running mode, the transmission shifting control portion 94 controls the gear ratio γcvt of the continuously-variable transmission mechanism 24 to the highest gear ratio value γmax.

However, a failure (hereinafter referred to as "belt-return failure") in which the gear ratio γcvt of the continuously-variable transmission mechanism 24 cannot be controlled to the highest gear ratio value γmax, could be caused, for example, due to a malfunction or limitation in control. In the arrangement in which only the highest gear ratio value γmax is set as the shift-up-action permitted gear ratio γupp, if the belt-return failure is caused, the state-switch-requiring shift-up action is not permitted to be executed. If the state-switch-requiring shift-up action cannot be executed during running in the gear running mode, the vehicle 10 would run even in a high running-speed range at the gear ratio EL of the gear mechanism 28 that is higher than the gear ratio γcvt of the continuously-variable transmission mechanism 24, so that the engine rotational speed Ne could become high enough to reach an excessively high speed ratio range (i.e., over-revolution range). If the accelerator pedal is kept operated with the engine rotational speed. Ne being in the excessively high speed ratio range, a fuel-cut control of the engine 12 could be frequently executed at an increased number of times whereby the drivability could be reduced.

In the present embodiment, when the vehicle running speed V is higher than a given value Vf, the shift-up-action permitted gear-ratio setting portion 96 sets, as the shift-up-action permitted gear ratio γupp, a predetermined gear ratio range (i.e., a predetermined range of the gear ratio γcvt) ranging from the highest gear ratio value γmax to a predetermined low gear ratio value (that may be referred also to as "predetermined high speed-side gear ratio value") γhif that is lower than the highest gear ratio value γmax.

The above-described given value Vf of the vehicle running speed V is a predetermined limit speed value that causes the engine rotational speed Ne to be an allowable upper limit speed value during running of the vehicle 10 in the gear running mode. The allowable upper limit speed value is an upper limit value within a range of the engine rotational speed Ne which is allowable in the engine 12. This allowable range of the engine rotational speed Ne is a range that is lower than the predetermined over-revolution range of the engine rotational speed Ne.

The above-described predetermined low gear ratio value γhif is a predetermined limit gear ratio value which causes the second clutch C2 to be heated by an allowable upper limit degree in process of the engagement of the second clutch C2, namely, which avoids the second clutch C2 from being heated by a degree exceeding the allowable upper limit degree in process of the engagement of the second clutch C2. Upon execution of the state-switch-requiring shift-up action, the amount of heat generation in process of the engagement of the second clutch C2 is larger as the gear ratio γcvt of the continuously-variable transmission mechanism 24 is smaller, because the amount of change of the primary rotational speed Npri, which is reduced upon execution of the state-switch-requiring shift-up action, is increased as the gear ratio γcvt of the continuously-variable transmission mechanism 24 is smaller. The above-described limit gear ratio value is predetermined such that the reduction of durability of the second clutch C2 by the hear generation is restrained. Avoiding the second clutch C2 from being heated by a degree exceeding the allowable upper limit degree in process of the engagement of the second clutch C2 is synonymous with restraining the reduction of durability of the second clutch C2 by the heat generation caused in process of the engagement of the second clutch C2.

The amount of reduction of the primary rotational speed Npri, which takes place upon execution of the state-switch-requiring shift-up action and which causes the heat generation in process of the engagement of the second clutch C2, is larger when the vehicle running speed V is high with the gear ratio γcvt of the continuously-variable transmission mechanism 24 being a certain value, than when the vehicle running speed V is low with the gear ratio γcvt being the same certain value. In view of this relationship between the amount of change of the primary rotational speed Npri and the running speed V, the predetermined low gear ratio value γhif is increased with increase of the running speed V (see FIG. 2), for restraining the reduction of durability of the second clutch C2 by the heat generation.

Figure 2:
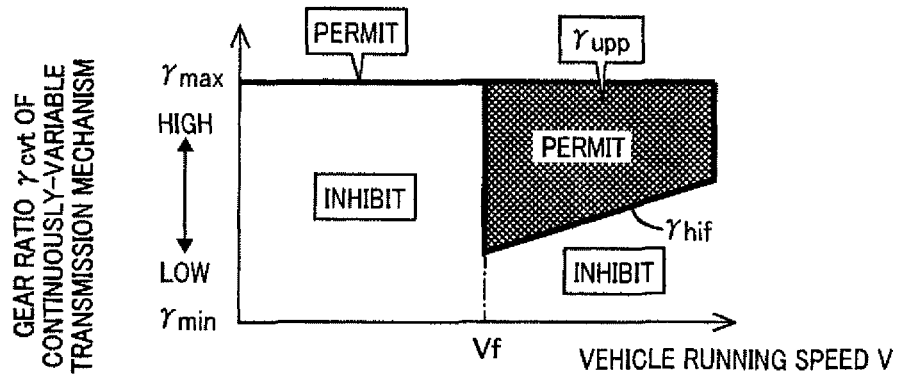
FIG. 2 is a view showing, by way of example, a relationship between a vehicle running speed and a shift-up-action permitted gear ratio.
Figure 3:
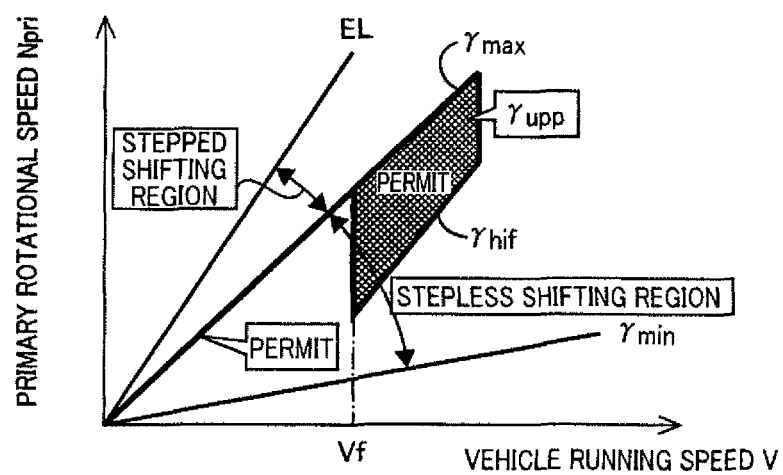
FIG. 3 is a view indicating the shift-up-action permitted gear ratio shown in FIG. 2, in a schematic view showing a stepped shifting map and a CVT shifting map.

FIG. 2 is a view showing a relationship between the vehicle running speed V and the shift-up-action permitted gear ratio γupp. FIG. 3 is a view indicating the shift-up-action permitted gear ratio γupp shown in FIG. 2, in a schematic view showing a stepped shifting map and a CVT shifting map. FIGS. 2 and 3 both show, by way of example, the present embodiment in which the above-described predetermined gear ratio range ranging from the highest gear ratio value γmax to the predetermined low gear ratio value γhif is set as the shift-up-action permitted gear ratio γupp, when the vehicle running speed V is higher than the given value Vf. As shown in FIGS. 2 and 3, in the present embodiment, when the gear ratio γcvt of the continuously-variable transmission mechanism 24 is the highest gear ratio value γmax, the state-switch-requiring shift-up action is permitted to be executed. Additionally, when the running speed V is higher than the given value Vf, the state-switch-requiring shift-up action is permitted to be executed as long as the gear ratio γcvt of the continuously-variable transmission mechanism 24 is within the above-described predetermined gear ratio range ranging from the highest gear ratio value γmax to the predetermined low gear ratio value γhif. On the other hand, the state-switch-requiring shift-up action is inhibited from being executed in (i) a case when the gear ratio γcvt of the continuously-variable transmission mechanism 24 is not the highest gear ratio value γmax with the running speed V being not higher than the given value Vf, and also in (ii) a case when the gear ratio γcvt of the continuously-variable transmission mechanism 24 is lower than the predetermined low gear ratio value γhif even with the running speed V being higher than the given value Vf. Thus, the execution of the state-switch-requiring shift-up action is permitted until shortly before the over-revolution range of the engine rotational speed Ne. In other words, the execution of the state-switch-requiring shift-up action, which is made without the gear ratio γcvt of the continuously-variable transmission mechanism 24 being the highest gear ratio value γmax and which could lead to reduction of the controllability, is not permitted until the running speed V becomes higher than the given value Vf. Further, even when the running speed V is higher than the given value Vf, the execution of the state-switch-requiring shift-up action is permitted only with the gear ratio γcvt of the continuously-variable transmission mechanism 24 being within the above-described predetermined gear ratio range that avoids the second clutch C2 from being heated by a degree exceeding the allowable upper limit degree in process of the engagement of the second clutch C2.

The state determining portion 98 determines whether the vehicle running speed V is higher than the given value Vf or not.

When it is determined by the state determining portion 98 that the running speed V is not higher than Vf, the shift-up-action permitted gear-ratio setting portion 96 sets the highest gear ratio value γmax as the shift-up-action permitted gear ratio γupp. When it is determined by the state determining portion 98 that the running speed V is higher than Vf, the shift-up-action permitted gear-ratio setting portion 96 sets, as the shift-up-action permitted gear ratio γupp, the above-described predetermined gear ratio range ranging from the highest gear ratio value γmax to the predetermined low gear ratio value γhif, which causes the second clutch C2 to be heated by the allowable upper limit degree in process of the engagement of the second clutch C2.

Figure 4:
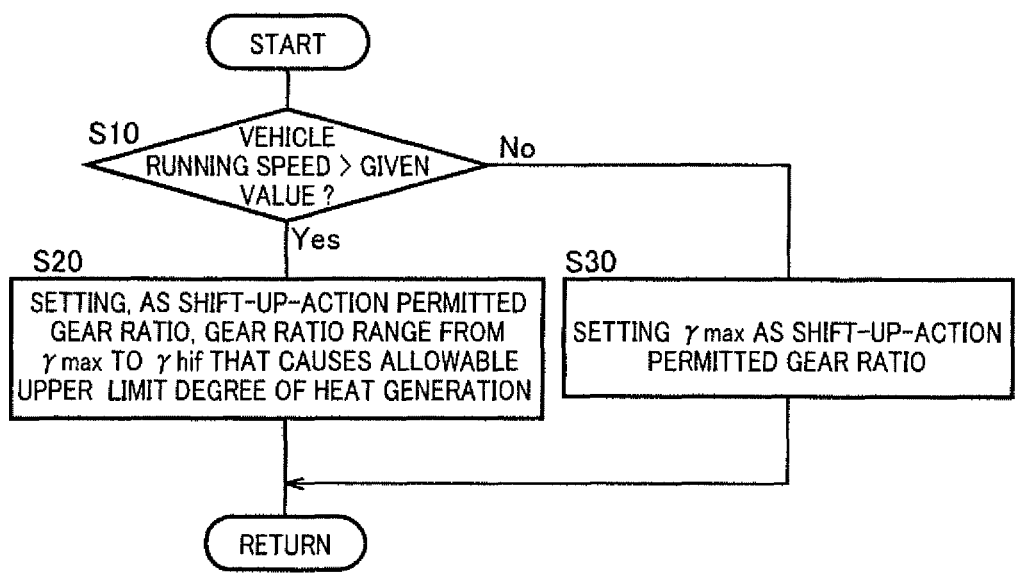
FIG. 4 is a flow chart illustrating a main part of a control routine executed by the control apparatus shown in FIG. 1, namely, a control routine that is executed for setting the shift-up-action permitted gear ratio for restraining reduction of a drivability.

FIG. 4 is a flow chart illustrating a main part of a control routine executed by the electronic control apparatus 90, namely, a control routine that is executed for setting the shift-up-action permitted gear ratio γupp for restraining reduction of the drivability. This control routine is executed repeatedly, for example, during running of the vehicle 10.

As shown in FIG. 4, the control routine is initiated with step S10 corresponding to function of the state determining portion 98, which is implemented to determine whether the vehicle running speed V is higher than the given value Vf or not. When an affirmative determination is made at step S10, step S20 corresponding to function of the shift-up-action permitted gear-ratio setting portion 96 is implemented to set, as the shift-up-action permitted gear ratio γupp, the predetermined gear ratio range ranging from the highest gear ratio value γmax to the predetermined low gear ratio value γhif, which causes the second clutch C2 to be heated by the allowable upper limit degree in process of the engagement of the second clutch C2. When a negative determination is made at step S10, the control flow goes to step S30 corresponding to function of the shift-up-action permitted gear-ratio setting portion 96 in which the highest gear ratio value γmax is set as the shift-up-action permitted gear ratio γupp.

As described above, in the present embodiment, the predetermined high gear ratio value γlowf in the form of the highest gear ratio value γmax is set as the shift-up-action permitted gear ratio γupp, so that the controllability of the state-switch-requiring shift-up action is improved. Further, the highest gear ratio value γmax is a value which lies in the above-described given range (within which the continuously-variable gear ratio γcvt of the continuously-variable transmission mechanism 24 is variable) and which is relatively close or adjacent to the gear ratio EL provided by the gear mechanism 28 in the first drive-force transmitting path PT1, so that it is possible to restrain an amount of change of the primary rotational speed Npri which is caused by execution of the state-switch-requiring shift-up action. Moreover, when the vehicle running speed V is higher than the given value Vf, the predetermined gear ratio range ranging from the highest gear ratio value γmax to the predetermined low gear ratio value γhif is set as the shift-up-action permitted gear ratio γupp, so that, even if the gear ratio γcvt of the continuously-variable transmission mechanism 24 cannot be controlled to the highest gear ratio value γmax due to a failure or other factor, there is a case where the state-switch-requiring shift-up action can be executed when the vehicle running speed V is higher than the given value Vf. Thus, it is possible to avoid the rotational speed Ne of the engine 12 from being excessively increased due to running of the vehicle 10 in a high running-speed range with the gear running mode being established. Thus, the shift-up-action permitted gear ratio γupp (which makes the state-switch-requiring shift-up action permitted to be executed) is set appropriately for restraining reduction of the drivability.

In the present embodiment, the given value Vf of the vehicle running speed V is a predetermined limit speed value that causes the engine rotational speed Ne to be an allowable upper limit speed value during running of the vehicle 10 in the gear running mode, so that the engine rotational speed Ne is avoided or restrained from exceeding the allowable upper limit speed value. Further, it is possible to maximize a running speed range of the vehicle 10 in which the state-switch-requiring shift-up action is not permitted to be executed without the gear ratio γcvt of the continuously-variable transmission mechanism 24 being the highest gear ratio value γmax.

In present embodiment, the state-switch-requiring shift-up action is executed by release of the first clutch C1 and engagement of the second clutch C2. Thus, the controllability of the state-switch-requiring shift-up action is improved by the above-described setting of the shift-up-action permitted gear ratio γupp of the continuously-variable transmission mechanism 24.

In present embodiment, the predetermined low gear ratio value γhif is a predetermined limit gear ratio value, which causes the second clutch C2 to be heated by an allowable upper limit degree in process of the engagement of the second clutch C2, namely, which avoids the second clutch C2 from being heated by a degree exceeding the allowable upper limit degree in process of the engagement of the second clutch C2. Thus, it is possible to restrain reduction of durability of the second clutch C2 which could be caused by execution of the state-switch-requiring shift-up action even without the gear ratio γcvt of the continuously-variable transmission mechanism 24 being the highest gear ratio value γmax.

In present embodiment, the predetermined low gear ratio value γhif is increased with increase of the vehicle running speed V. It is therefore possible to restrain increase of the amount of change of the primary rotational speed Npri upon execution of the state-switch-requiring shift-up action. Thus, it is possible to restrain reduction of durability of the second clutch C2 which could be caused by execution of the state-switch-requiring shift-up action even without the gear ratio γcvt of the continuously-variable transmission mechanism 24 being the highest gear ratio value γmax.

While the preferred embodiment of this invention has been described in detail by reference to the drawings, it is to be understood that the invention may be otherwise embodied.

In the above described embodiment, the predetermined high gear ratio value γlowf is the highest gear ratio value γmax. However, the predetermined high gear ratio value γlowf does not necessarily have to be precisely the highest gear ratio value γmax, but may be substantially the highest gear ratio value γmax, or a value adjacent to the highest gear ratio value γmax as long as the adjacent value as the shift-up-action permitted gear ratio γupp enables the state-switch-requiring shift-up action to be executed with the amount of change of the primary rotational speed Npri being restrained.

In the above-described embodiment, the given value Vf of the vehicle running speed V is a predetermined limit speed value that causes the engine rotational speed Ne be an allowable upper limit speed value during running of the vehicle 10 in the gear running mode. However, in terms of avoiding the engine rotational speed Ne from being increased so much to reach the over-revolution range, the given value Vf may be lower than the above-described limit speed value. For example, the given value Vf may be a predetermined speed value (i.e., shift-up-action requiring running speed) that causes the state-switch-requiring shift-up action to be determined to be executed. This predetermined speed value is, for example, a value of the running speed V at which it is determined that the state-switch-requiring shift-up action is to be executed, where the determination is made based on a predetermined shift-up line. Thus, the engine rotational speed Ne is reliably avoided or restrained from exceeding the allowable upper limit speed value.

In the above-described embodiment, when the running speed V is higher than the given value Vf, the shift-up-action permitted gear-ratio setting portion 96 sets, as the shift-up-action permitted gear ratio γupp, the above-described predetermined gear ratio range ranging from the highest gear ratio value γmax to the predetermined low gear ratio value γhif. This setting of the shift-up-action permitted gear ratio γupp to the predetermined gear ratio range may be made in a case where the above-described belt-return failure is caused, for example, due to malfunction. For example, it is possible to make a determination as to whether the belt-return failure is occurring or not, prior to execution of the control routine shown in the flow chart of FIG. 4, so that the control routine of FIG. 4, which is initiated with step S10, is executed when it is determined that the belt-return failure is occurring. In this modified arrangement, when it is determined that the belt-return failure is not occurring, only the highest gear ratio value γmax is set as the shift-up-action permitted gear ratio γupp, irrespective of the running speed V, as shown in FIG. 5.

In the above-described embodiment, the continuously-variable transmission mechanism 24 is a belt-type continuously-variable transmission. However, the continuously-variable transmission mechanism provided in the second drive-force transmitting path PT2 may be a known toroidal-type continuously variable transmission, for example. Where the continuously-variable transmission mechanism is the toroidal-type continuously variable transmission, too, there could be a case when the gear ratio cannot be controlled to the highest gear ratio value, for example, due to a malfunction or limitation in control, although the belt-return failure does not occur.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio value γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Where the gear mechanism 28 provides a plurality of different gear ratios, the plurality of gear ratios may include a gear ratio lower than the lowest gear ratio γmin of the continuously-variable transmission mechanism 24 in addition to a gear ratio that is higher than the highest gear ratio value γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
64: secondary pulley
66: transmission belt (transfer element)
90: electronic control apparatus (control apparatus)
96: shift-up-action permitted gear-ratio setting portion
PT1: first drive-force transmitting path
PT2: second drive-three transmitting path
C1: first clutch (first engagement device)
C2: second clutch (second engagement device)

What is claimed is:

1. A control apparatus for a drive-force transmitting apparatus that is to be provided in a vehicle having a drive force source and drive wheels,
   wherein the drive-force transmitting apparatus includes:
   an input rotary member to which a drive force is to be transmitted from the drive force source;
   an output rotary member from which the drive force is to be outputted to the drive wheels;
   a continuously-variable transmission mechanism configured to provide a continuously-variable gear ratio that is variable within a given range; and
   a gear mechanism configured to provide at least a gear ratio that is higher than the continuously-variable gear ratio provided by the continuously-variable transmission mechanism,
   wherein the drive-force transmitting apparatus defines a plurality of drive-force transmitting paths that are provided in parallel with each other between the input rotary member and the output rotary member such that the drive force is to be transmitted from the input rotary member to the output rotary member through an established one of the drive-force transmitting paths,
   wherein the plurality of drive-force transmitting paths include a first drive-force transmitting path, through which the drive force is to be transmitted by the gear mechanism when the first drive-force transmitting path is established,
   wherein the plurality of drive-force transmitting paths include a second drive-force transmitting path, through which the drive force is to be transmitted by the continuously-variable transmission mechanism when the second drive-force transmitting path is established,
   wherein the drive-force transmitting apparatus is configured to establish a selected state that is one of (i) a first state in which the first drive-force transmitting path is established and (ii) a second state in which the second drive-force transmitting path is established, such that the selected state is switched from the first state to the second state when a state-switch-requiring shift-up action is executed in the drive-force transmitting apparatus,
   wherein said control apparatus comprises a shift-up-action permitted gear-ratio setting portion configured to set a shift-up-action permitted gear ratio that is a value or a range of the continuously-variable gear ratio of the continuously-variable transmission mechanism, which makes the state-switch-requiring shift-up action permitted to be executed, such that the state-switch-requiring shift-up action requiring the selected state to be switched from the first state to the second state is permitted to be executed when the continuously-variable gear ratio of the continuously-variable transmission mechanism corresponds to said shift-up-action permitted gear ratio,
   wherein said shift-up-action permitted gear-ratio setting portion is configured, when a running speed of the vehicle is not higher than a given value, to set a predetermined high gear ratio value as said shift-up-action permitted gear ratio, and
   wherein said shift-up-action permitted gear-ratio setting portion is configured, when the running speed of the vehicle is higher than said given value, to set, as said shift-up-action permitted gear ratio, a predetermined gear ratio range ranging from said predetermined high gear ratio value to a predetermined low gear ratio value that is lower than said predetermined high gear ratio value.

2. The control apparatus according to claim 1, wherein said predetermined high gear ratio value is a highest value within the given range in which the continuously-variable gear ratio of the continuously-variable transmission mechanism is variable, or is a value adjacent to the highest value.

3. The control apparatus according to claim 1, wherein said given value of the running speed of the vehicle is a predetermined limit speed value that causes a rotational speed of the drive force source to be an allowable upper limit speed value during running of the vehicle in the first state in which the first drive-force transmitting path is established.

4. The control apparatus according to claim 1, wherein said given value of the running speed of the vehicle is a predetermined speed value at which the state-switch-requiring shift-up action is determined to be executed.

5. The control apparatus according to claim 1,
   wherein the drive-force transmitting apparatus further includes a first engagement device that is provided in the first drive-force transmitting path and a second engagement device that is provided in the second drive-force transmitting path,
   wherein the first drive-force transmitting path is to be established by engagement of the first engagement device while the second drive-force transmitting path is to be established by engagement of the second engagement device, and
   wherein the state-switch-requiring shift-up action is executed by release of the first engagement device and engagement of the second engagement device.

6. The control apparatus according to claim 5,
   wherein the second engagement device is a frictional engagement device, and
   wherein said predetermined low gear ratio value is a predetermined limit gear ratio value that causes the second engagement device to be heated by an allowable upper limit degree in process of the engagement of the second engagement device.

7. The control apparatus according to claim 6, wherein said predetermined low gear ratio value is increased with increase of the running speed of the vehicle.

8. The control apparatus according to claim 1, wherein the continuously-variable transmission mechanism is a belt-type continuously-variable transmission including a primary pulley, a secondary pulley, a transfer element that is looped over the primary and secondary pulleys.

9. The control apparatus according to claim 1, further comprising a state determining portion configured to determine whether the running speed of the vehicle is not higher than said given value or not,
   wherein said shift-up-action permitted gear-ratio setting portion is configured, when said state determining portion determines that the running speed is not higher than said given value, to set said predetermined high gear ratio value as said shift-up-action permitted gear ratio, and
   wherein said shift-up-action permitted gear-ratio setting portion is configured, when said state determining portion determines that the running speed is higher than said given value, to set said predetermined gear ratio range as said shift-up-action permitted gear ratio.

* * * * *